United States Patent
Arthur et al.

(10) Patent No.: US 7,880,429 B2
(45) Date of Patent: Feb. 1, 2011

(54) POWER MANAGEMENT METHOD USING FEEDBACK CURRENT BIAS FOR SIMULTANEOUSLY CONTROLLING LOW CELLS AND OVERALL STACK VOLTAGE

(75) Inventors: David A. Arthur, Honeoye Falls, NY (US); Sriram Ganapathy, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 472 days.

(21) Appl. No.: 12/119,922

(22) Filed: May 13, 2008

(65) Prior Publication Data
US 2009/0284214 A1    Nov. 19, 2009

(51) Int. Cl.
*H01M 10/44* (2006.01)
*H02J 7/00* (2006.01)
*H01M 8/04* (2006.01)

(52) U.S. Cl. .............. 320/101; 320/138; 320/139; 429/431; 429/432

(58) Field of Classification Search .......... 320/101
See application file for complete search history.

(56) References Cited

U.S. PATENT DOCUMENTS

| 6,406,806 | B1 * | 6/2002 | Keskula et al. | 429/432 |
| 6,428,917 | B1 * | 8/2002 | Lacy et al. | 429/432 |
| 6,692,851 | B2 * | 2/2004 | Keskula et al. | 429/431 |
| 2004/0151955 | A1 * | 8/2004 | Keskula et al. | 429/13 |
| 2006/0057442 | A1 * | 3/2006 | Noetzel et al. | 429/13 |
| 2010/0013309 | A1 * | 1/2010 | Rosenblatt et al. | 307/64 |

* cited by examiner

*Primary Examiner*—Edward Tso
*Assistant Examiner*—Yalkew Fantu
(74) *Attorney, Agent, or Firm*—John A. Miller; Miller IP Group, PLC

(57) ABSTRACT

A method for controlling the current output from a fuel cell stack to prevent the stack voltage or the minimum fuel cell voltage from dropping below predetermined voltage set-points. The method for the stack voltage control includes determining whether the stack voltage has dropped to the predetermined voltage set-point, and if so, capturing and holding the actual stack current at that point as the maximum allowed stack current. If the stack voltage continues to fall below the voltage set-point, then the voltage set-point is subtracted from the actual voltage to get a positive error signal. Controller gains are then multiplied by the error signal to reduce the current allowed from the stack to drive the error signal to zero, and increase the stack voltage. The method for the minimum fuel cell voltage operates in the same manner, but with different values.

20 Claims, 3 Drawing Sheets

POWER MANAGEMENT METHOD USING FEEDBACK CURRENT BIAS FOR SIMULTANEOUSLY CONTROLLING LOW CELLS AND OVERALL STACK VOLTAGE

BACKGROUND OF THE INVENTION

1. Field of the Invention

This invention relates generally to a method for controlling the output current of a fuel cell stack and, more particularly, to a method for immediately reducing the output current of a fuel cell stack if either the minimum cell voltage or the stack voltage drops to a predetermined voltage set-point, and then increasing the allowed current in a controlled manner if the minimum cell voltage or the stack voltage increases above the set-point.

2. Discussion of the Related Art

Hydrogen is a very attractive fuel because it is clean and can be used to efficiently produce electricity in a fuel cell. A hydrogen fuel cell is an electrochemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack.

As is well understood in the art, if a minimum cell voltage or the overall stack voltage falls below a predetermined value, then cell voltage reversal becomes a possibility that may lead to a rapid reduction in the catalyst carbon support in the MEA, ultimately lowering the cell voltage and overall system durability and reliability. For example, for a minimum cell below 300 mA, it is desirable to reduce the current output from the stack because the low performing cell could generate a significant amount of heat, and if the voltage output of the cell goes below zero, it will begin to corrode the carbon in the MEAs.

Typically, it is a significant challenge to maintain a minimum stack voltage and at the same time allow for very fast up-transients and current draw from the stack. For those cases where the current draw from the stack must be reduced to avoid too low of a stack voltage, it has been a challenge to know how to reduce the current quickly and smoothly to avoid oscillations or more loss in power than is necessary. Further, it has been a challenge to know when to start adding allowed current back when the stack recovers. If the added current subsequently sends the stack voltage low again, the process to avoid oscillation is yet another challenge.

There are known techniques for reducing allowed stack current as the stack voltage and/or minimum cell voltage falls below a threshold. One known technique uses a modeled voltage/current curve and limits current based purely on a predicted voltage/current slope of the curve. The problem with this implementation is the slope often intervenes in a situation it does not need to, typically too harshly, thereby limiting transient rates. It has also been known to not intervene in situations where it should have. Another alternative can be to use a standard proportional-integral (PI) controller without a bias where there is an error generated that is amplified by the P and I gains to reduce current. The problem with this implementation without a bias is that if the feedback voltage goes below the threshold at a low current, then there is a period of time where the P and I gains are reducing current from the maximum system current, but not reducing the actual system current. As a result, the current can rise while it should be falling and valuable intervention time is lost. In an effort to increase the response of this implementation, it is tempting to increase the P and I gains. However it is then very easy to trigger heavy oscillations and/or overly aggressive reductions. The stack voltage threshold is selected to be some value above a true minimum stack voltage where high voltage components in the system will shut down to protect the system.

SUMMARY OF THE INVENTION

In accordance with the teachings of the present invention, a method is disclosed for controlling the current output from a fuel cell stack to prevent the stack voltage or the minimum fuel cell voltage from dropping below predetermined voltage set-points. The method for the stack voltage control includes determining whether the stack voltage has dropped to the predetermined voltage set-point, and if so, capturing and holding the actual stack current at that point as the maximum allowed stack current. If the stack voltage continues to fall below the voltage set-point, then the voltage set-point is subtracted from the actual voltage to get a positive error signal. Controller gains are then multiplied by the error signal to reduce the current allowed from the stack to drive the error signal to zero, and increase the stack voltage. If the stack voltage is greater than the voltage set-point, but less than a voltage threshold, then the actual stack voltage is subtracted from the voltage set-point to generate another positive error signal that is multiplied by a controller gain to increase the allowed stack current and drive the stack output voltage to the set-point. The method for the minimum fuel cell voltage operates in the same manner, but with different values.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for reducing and controlling the current output from a fuel cell stack in response to the stack voltage or a minimum cell voltage falling below predetermined voltage set-points is merely exemplary in nature, and is in no way intended to limit the invention or its applications or uses.

As will be discussed in detail below, the present invention proposes a method for reducing the allowed current output from a fuel cell stack if either the stack voltage or a minimum cell voltage falls to a predetermined voltage set-point, and then selectively increasing the allowed current output as the minimum cell voltage or the stack voltage begins to recover. The process includes immediately reducing the allowed current output from the fuel cell stack to its present value as soon as either the stack voltage or the minimum cell voltage reaches the voltage set-point. Then, as the stack voltage or the minimum cell voltage begins to increase, more current is allowed to be drawn from the stack in a controlled manner. This is opposed to the prior art techniques of controlling the stack current flow from the fuel cell stack that reduces the current from its normal maximum value or increases the current from zero when the minimum cell voltage or the stack voltage reaches the set-point using the gains of the controller.

Figure 1:
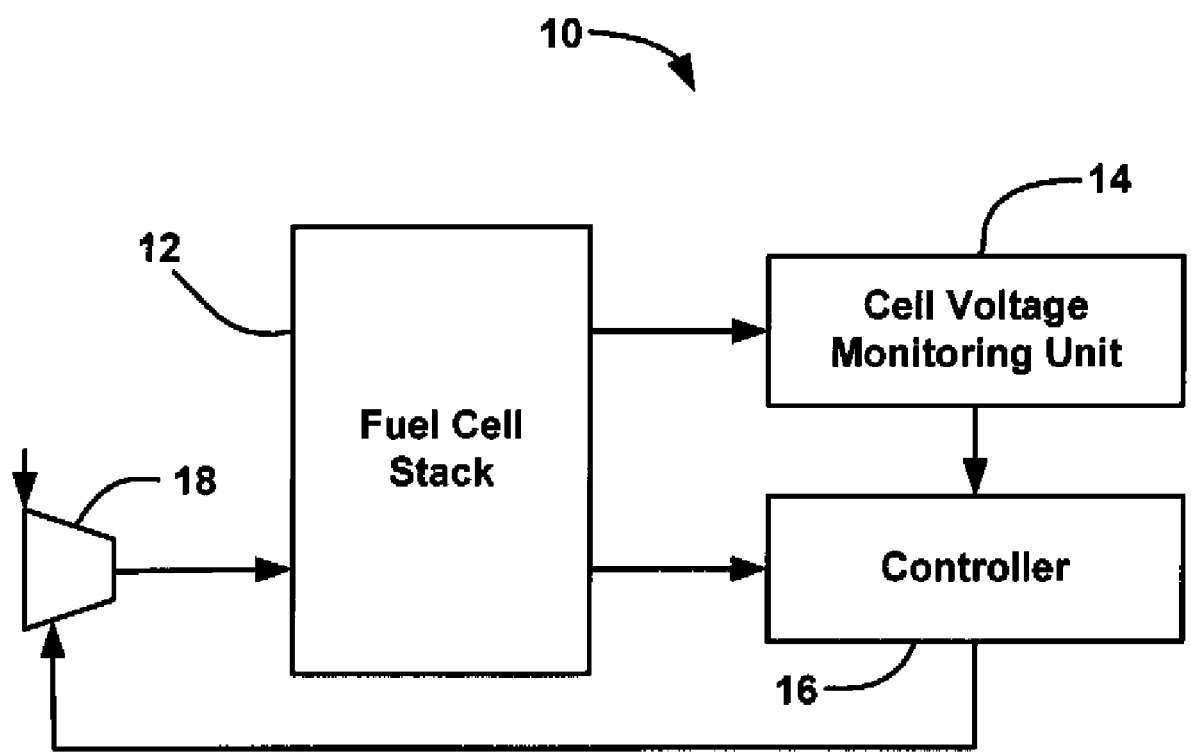
FIG. 1 is a block diagram of a fuel cell system employing a controller that controls the current output from a fuel cell stack, according to an embodiment of the present invention.

FIG. 1 is a general block diagram of a fuel cell system 10 including a fuel cell stack 12. The system 10 also includes a cell voltage monitoring unit 14 that monitors the individual voltage outputs of the fuel cells in the fuel cell stack 12, and provides the voltage signals to a controller 16. Additionally, the controller 16 receives a stack voltage signal from the fuel cell stack 12. As will be discussed in detail below, the controller 16 controls the allowed current output of the fuel cell stack 12 in response to one or both of the fuel cells falling below a minimum cell voltage set-point or the stack voltage falling below a minimum stack voltage set-point. The controller 16 can control the output current of the fuel cell stack 12 by controlling a compressor 18 that provides cathode input air to the fuel cell stack 12.

Figure 2:
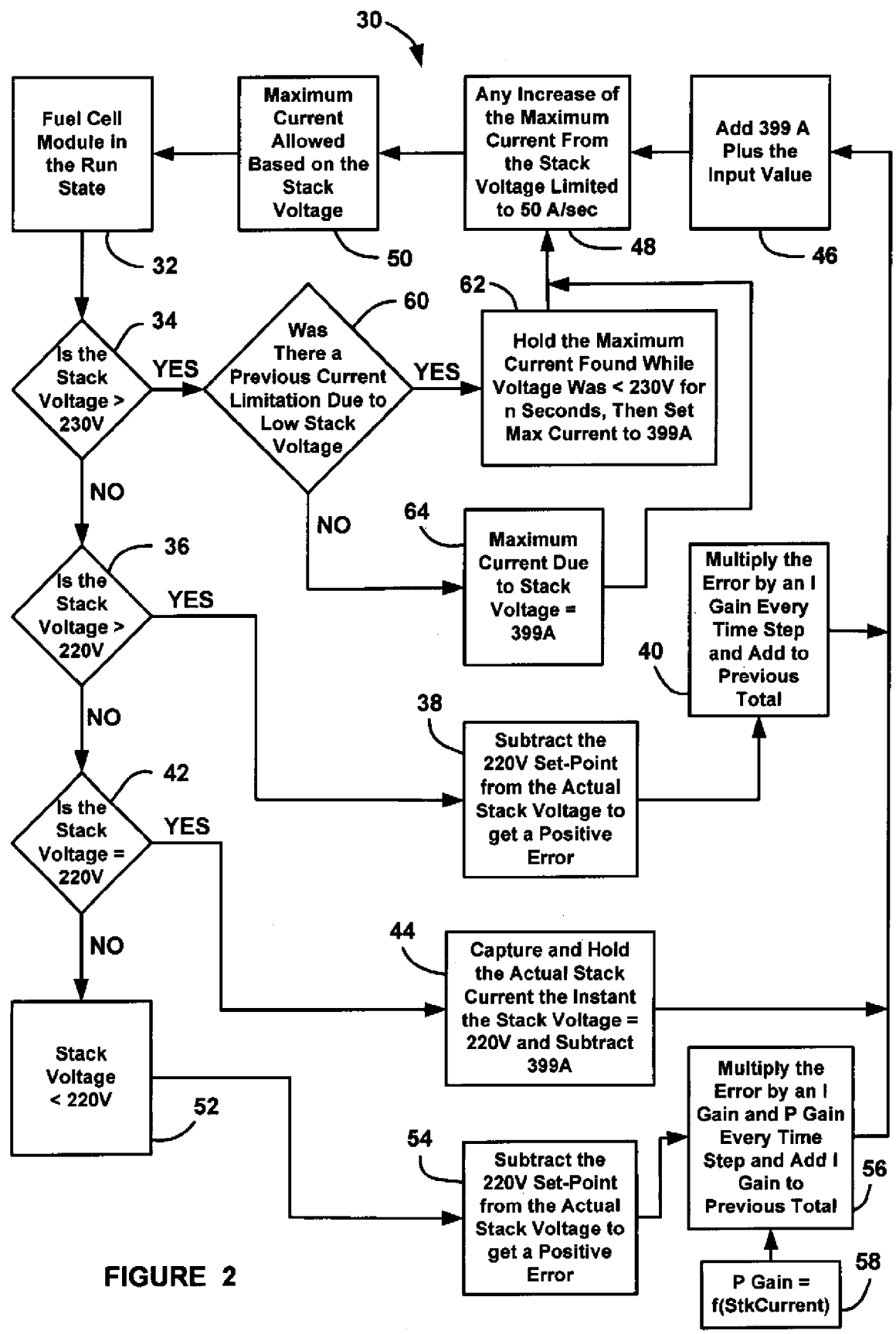
FIG. 2 is a flow chart diagram showing a process used by the controller in the system shown of FIG. 1 for reducing and controlling the current output from the fuel cell stack in response to the stack voltage falling below a predetermined voltage set-point, according to an embodiment of the present invention.

FIG. 2 is a flow chart diagram 30 showing a process performed by an algorithm in the controller 16 for limiting and controlling the current output of the fuel cell stack 12 when the stack voltage falls below a predetermined threshold set-point, such as 220V, according to an embodiment of the present invention. The value 220V is application specific, and is selected in this embodiment to be relative to a minimum stack voltage of 180V where high voltage components in the system 10 begin to turn off. The algorithm first determines whether the fuel cell module or the stack 12 is in a normal run state at box 32. If the fuel cell module is in the normal run state, then the algorithm will ask whether the stack output voltage is greater than 230V at decision diamond 34. The 230V is considered the end of service voltage of the system.

If the stack voltage is not greater than 230V at the decision diamond 34, then the algorithm will ask whether the stack voltage is greater than 220V at decision diamond 36, which is the voltage set-point for limiting current flow in response to the minimum stack voltage. If the stack voltage is greater than 220V at the decision diamond 36, then the algorithm subtracts the 220V set-point from the actual stack voltage to get a positive error signal at box 38. At this point, the fuel cell stack output voltage is still above the 220V set-point, where more current can still be provided from the stack 12.

The error signal is multiplied by an integral gain I at every time step and added to a previous total at box 40 in this example to increase the available current flow. However, the first time through this part of the process for a drop in the stack output voltage, the stack 12 should already be at maximum allowed current because the voltage has not yet dropped to the voltage set-point 220V. The integral gain I adds current until the error signal is zero and the stack voltage is exactly 220V, or until the maximum current output of the stack is 399 A the predetermined maximum current of the stack 12 at box 46. The integral gain I should have a maximum ramp rate divided by a maximum negative error, such as 10V, or 50 A/sec, at box 48. Note that there is no proportional gain P in this case. The maximum current allowed is then set at box 50 based on the stack voltage as discussed, and the algorithm returns to the box 32 to determine if the fuel cell module is still in a run state.

If the stack voltage is not greater than the 220V set-point at the decision diamond 36, then the algorithm determines whether the stack voltage is equal to 220V at decision diamond 42. At the instant the stack voltage reaches the 220V set-point, the current that is being drawn from the stack 12 at that point in time is captured and held at box 44, and the maximum stack current 399 A is subtracted from the held current. This will be a negative number that is added to the maximum current 399 A at the box 46 so that the present current output is now the maximum allowed current from the stack 12. If the current is being added where it is increasing, there is a rate limit as to how fast the current flow can increase at the box 48, as discussed above.

Any decrease in the maximum current output of the stack 12 is instant. Instant here is defined as the capability to reduce current by the maximum system current in one time step. For example, if the maximum current is 399 A and the system time step is 12.5 ms, then for the down current rate to be guaranteed instant, it would need to be greater than 399/0.0125 or greater than 31920 A/sec. The difference between the maximum current output and the calculated current bias is now the maximum current allowed based on the stack voltage at the box 50.

The process will then go back through the decision diamonds 34, 36 and 42, where if the stack voltage is still decreasing, then the output of the decision diamond 42 will be no, and the stack voltage will be less than 220V at box 52. The algorithm then subtracts the actual stack voltage from the 220V stack set-point to get a positive error signal at box 54. The error signal is then multiplied by the integral gain I and the proportional gain P every time step, and the integral gain I is added to the previous total at box 56. The integral gain I subtracts current until the error signal is zero and the stack voltage is exactly 220V, or until the maximum current output is some value, such as 36 A. The integral gain I should be dictated by the negative error case.

In this non-limiting embodiment, the integral gain I is constant and the proportional gain P is provided by a look-up table 58 that sets the proportional gain P as a function of the stack current. The proportional gain P should be calibrated so that at every current output, a minimum system voltage, such as a stack voltage of 180V, results in some minimum current, such as 10 A. This calculation must include the fact that at 220V, the current feedback is captured as a bias term. The proportional gain P should also be clipped at some maximum value. This value can be found experimentally by investigating the highest proportional gain P at steady-state that gives acceptably low oscillations. This also can be found analytically by using sensor accuracy, precision, system stability, etc. The new minimum stack current is then subtracted from the maximum current 399 A at the box 46, as discussed above, and the new maximum current allowed based on stack voltage is again reset at the box 50.

As the current output of the stack 12 is being reduced because the voltage has fallen to 220V or below, the stack voltage may then increase and recover as a result of the reduced maximum current output. As the algorithm goes through the decision diamonds 34, 36 and 42, the stack voltage may be less than 230V at the decision diamond 34 and greater than 220V at the decision diamond 36, where the positive error signal is generated at the box 38 as discussed above. In this situation, the error signal is multiplied by the integral gain I at the box 40 to add current at the box 46, which is rate limited at the box 48, to set the new current at the box 50, which is now higher than the previous maximum current.

Eventually, the stack 12 should recover where the stack voltage will go above 230V at the decision diamond 34 for the maximum current output that has been increased from a previous value. The algorithm will then ask was there a previous current limitation due to low stack voltage at decision diamond 60, and if so, the algorithm will hold the maximum current output from the previous iteration for a predetermined number of n seconds, and then set the maximum current to 399 A at box 62. After the n seconds have elapsed, the rise in current will be rate limited at the box 48, and set at the box 50, as discussed above. If there was not a previous limitation due to low stack voltage at the decision diamond 60, then the algorithm sets the maximum current to 399 A at box 64. This operation acts as a debouncer so that the control does not immediately go back to reducing the current output of the stack 12.

The time n acts as a memory affect. In one implementation, the time n could be zero seconds, where the instant the stack voltage goes above 230V, the maximum current output starts increasing at 50 A/sec at the box 48. This would possibly trade off reliability for performance. In another implementation, the time n could be 60 seconds, where the maximum current that was found previously when the stack voltage was less than 230V is held as the maximum current for 60 seconds. This would trade off performance for reliability. For example, assume that the stack 12 was at maximum power where the power manager reduced the current to 250 A resulting in maintaining 220V perfectly. If there is a down-transient and the minimum cell voltage rises above 230V very quickly, the down-transient may then be followed by an up-transient back to maximum power within 60 seconds, and the maximum current will be remembered from the last time the system was at maximum power. If the system's health has not changed since the last time, this will result in a nearly perfect up-transient to the maximum current corresponding to 220V.

As discussed above, the stack current is also limited if the output voltage of the lowest performing cell falls below a certain voltage set-point, such as 300 mV in this non-limiting embodiment. The same process as discussed above for the stack voltage is used to limit the current of the stack 12 for a low performing cell.

Figure 3:
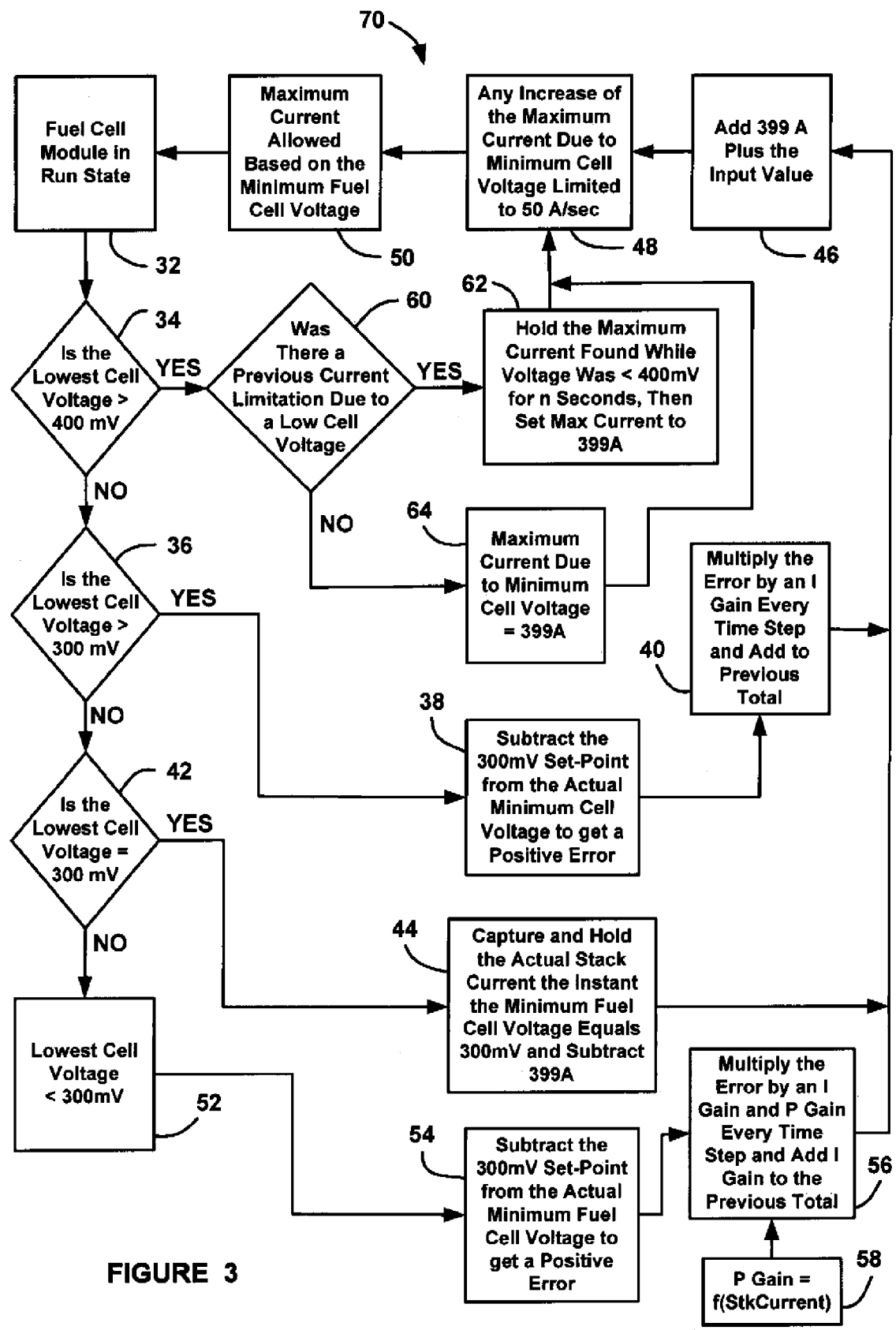
FIG. 3 is a flow chart diagram showing a process used by the controller in the system of FIG. 1 for reducing and controlling the current output from the fuel cell stack in response to a minimum cell voltage falling below a predetermined voltage set-point, according to an embodiment of the present invention.

FIG. 3 is a flow chart diagram 70 that shows the operation for a minimum cell voltage, where like elements are identified by the same reference number, according to another embodiment of the present invention. The low cell voltage set-point is selected to be 300 mV at the decision diamonds 36 and 42, and the low cell voltage threshold is selected to be 400 mV for the decision diamond 34. Further, the minimum cell voltage set-point is subtracted from the actual minimum cell voltage at the boxes 38 and 54. The operation of limiting the current is performed in the same manner as that of FIG. 2. The proportional gain P and the integral gain I may be different than what is used in the process of FIG. 2 and would be application specific.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for reducing and controlling the current output from a fuel cell stack in response to an output voltage of the fuel cell stack dropping to a predetermined stack voltage set-point, said method comprising:

determining whether the stack voltage has dropped to the predetermined voltage set-point;

holding the current output that is being drawn from the fuel cell stack when the voltage drops to the voltage set-point as a maximum stack current output allowed from the fuel cell stack;

determining whether the stack voltage has dropped below the stack voltage set-point;

subtracting the stack voltage set-point from the actual stack voltage to get a first positive error signal if the stack voltage has dropped below the voltage set-point; and multiplying the error signal by at least one gain signal so as to reduce the maximum stack current output allowed from the fuel cell stack and drive the first positive error signal to zero.

2. The method according to claim 1 further comprising determining whether the stack voltage is below a predetermined threshold voltage that is greater than the stack voltage set-point, and if so, subtracting the voltage set-point from the actual stack voltage to get a second positive error signal and multiplying the second positive error signal by a predetermined gain to reduce the second positive error signal to zero and reduce the stack voltage to the voltage set-point.

3. The method according to claim 2 further comprising determining whether there was a previous stack current output limitation as a result of a low stack voltage if the stack voltage is not below the threshold voltage, and further comprising holding the maximum stack current output allowed at a previous maximum stack current output allowed when the stack voltage was below the voltage threshold for a predetermined period of time if there was a current limitation due to low stack voltage.

4. The method according to claim 2 wherein the predetermined gain multiplied by the second positive error signal is an integral gain for an integral controller.

5. The method according to claim 1 further comprising rate limiting an increase in current output if the stack voltage falls to the predetermined voltage set-point and then is increased.

6. The method according to claim 1 wherein the at least one gain is an integral gain and a proportional gain for a proportional-integral controller.

7. The method according to claim 6 wherein the integral gain is constant and the proportional gain is a function of the stack current.

8. The method according to claim 1 wherein the predetermined stack voltage set-point is 220 volts.

9. A method for reducing and controlling the current output from a fuel cell stack in response to an output voltage of the fuel cell stack dropping to a predetermined stack voltage set-point, said method comprising:
   determining whether the stack voltage has dropped below a predetermined voltage threshold that is more than the voltage set-point;
   determining whether the stack voltage is greater than the voltage set-point if the stack voltage has dropped below the voltage threshold;
   determining whether the stack voltage is equal to the voltage set-point;
   determining whether the stack voltage has dropped below the voltage set-point;
   holding the current output from the fuel cell stack if the stack voltage drops equals the voltage set-point as a maximum stack current output allowed from the fuel cell stack;
   subtracting the stack voltage set-point from the actual stack voltage to get a first positive error signal if the stack voltage drops below the voltage set-point;
   multiplying the first positive error signal by at least one gain signal so as to reduce the maximum stack current output allowed from the fuel cell stack and drive the first positive error signal to zero;
   subtracting the voltage set-point from the actual stack voltage to get a second positive error signal if the stack voltage is between the voltage threshold and the voltage set-point;
   multiplying the second positive error signal by a gain to set the maximum stack current output allowed from the fuel cell stack;
   determining whether there was a previous current limitation as a result of low stack voltage if the stack voltage is not less than the predetermined voltage threshold; and
   holding the maximum stack current output allowed at a previous maximum stack current output allowed when the stack voltage was below the voltage threshold for a predetermined period of time if there was a current limitation due to low stack voltage.

10. The method according to claim 9 further comprising rate limiting an increase in current output of the stack if the stack voltage falls to the predetermined voltage set-point and then is increased.

11. The method according to claim 9 wherein the at least one gain is an integral gain and a proportional gain and the gain for the second positive error signal is an integral gain for a proportional-integral controller.

12. The method according to claim 9 wherein the stack voltage set-point is 220 volts and the voltage threshold is 230 volts.

13. A method for reducing and controlling the current output from a fuel cell stack in response to a minimum fuel cell voltage of a fuel cell in the stack dropping to a predetermined minimum fuel cell voltage set-point, said method comprising:
   determining whether the minimum fuel cell voltage has dropped to the predetermined minimum fuel cell voltage set-point;
   holding the current output that is being drawn from the fuel cell stack when the voltage drops to the voltage set-point as a maximum stack current output allowed from the fuel cell stack;
   determining whether the minimum fuel cell voltage has dropped below the minimum fuel cell voltage set-point;
   subtracting the minimum fuel cell voltage set-point from the actual minimum fuel cell voltage to get a first positive error signal if the minimum fuel cell voltage has dropped below the voltage set-point; and
   multiplying the error signal by at least one gain signal so as to reduce the maximum stack current output allowed from the fuel cell stack and drive the first positive error signal to zero.

14. The method according to claim 13 further comprising determining whether the minimum fuel cell voltage is below a predetermined threshold voltage that is greater than the minimum fuel cell voltage set-point, and if so, subtracting the voltage set-point from the actual minimum fuel cell voltage to get a second positive error signal and multiplying the second positive error signal by a predetermined gain to reduce the second positive error signal to zero and reduce the minimum fuel cell voltage to the voltage set-point.

15. The method according to claim 14 further comprising determining whether there was a previous stack current output limitation as a result of a minimum fuel cell voltage if the minimum fuel cell voltage is not below the threshold voltage, and further comprising holding the maximum stack current output allowed at a previous maximum stack current output allowed when the minimum fuel cell voltage was below the voltage threshold for a predetermined period of time if there was a current limitation due to minimum fuel cell voltage.

16. The method according to claim 14 wherein the predetermined gain multiplied by the second positive error signal is an integral gain for an integral controller.

17. The method according to claim 13 further comprising rate limiting an increase in current output if the minimum fuel cell voltage falls to the predetermined voltage set-point and then is increased.

18. The method according to claim 13 wherein the at least one gain is an integral gain and a proportional gain for a proportional-integral controller.

19. The method according to claim 18 wherein the integral gain is constant and the proportional gain is a function of the stack current.

20. The method according to claim 13 wherein the predetermined minimum fuel cell voltage set-point is 300 mV.

* * * * *